United States Patent
Li et al.

(10) Patent No.: US 9,618,784 B2
(45) Date of Patent: Apr. 11, 2017

(54) LIQUID CRYSTAL MODULE AND HEAT DISSIPATION STRUCTURE THEREFORE

(71) Applicant: Shenzhen China Star Optoelectronics Technology Co., Ltd., Shenzhen, Guangdong (CN)

(72) Inventors: Dehua Li, Guangdong (CN); Yuchun Hsiao, Guangdong (CN); Shihhsiang Chen, Guangdong (CN); Yongyuan Qiu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 60 days.

(21) Appl. No.: 14/425,087

(22) PCT Filed: Oct. 15, 2014

(86) PCT No.: PCT/CN2014/088666
§ 371 (c)(1),
(2) Date: Mar. 2, 2015

(87) PCT Pub. No.: WO2016/058146
PCT Pub. Date: Apr. 21, 2016

(65) Prior Publication Data
US 2016/0246105 A1    Aug. 25, 2016

(30) Foreign Application Priority Data

Oct. 13, 2014    (CN) .......................... 2014 1 0537870

(51) Int. Cl.
*F21V 29/00*    (2015.01)
*G02F 1/1333*    (2006.01)
*F21V 8/00*    (2006.01)

(52) U.S. Cl.
CPC ..... *G02F 1/133382* (2013.01); *G02B 6/0085* (2013.01); *G02F 1/133308* (2013.01);
(Continued)

(58) Field of Classification Search
CPC ......... G02F 1/133382; G02F 1/133308; F21V 29/85
(Continued)

(56) References Cited

U.S. PATENT DOCUMENTS

2010/0014287 A1*    1/2010    Chiang ................. F21V 17/162
                                                                        362/231
2013/0215359 A1*    8/2013    Chun .................... G02F 1/1333
                                                                        349/58

(Continued)

FOREIGN PATENT DOCUMENTS

| CN | 102798044 A | 11/2012 |
|----|-------------|---------|
| CN | 102865528 A | 1/2013 |
| CN | 104062806 A | 9/2014 |

Primary Examiner — Andrew Coughlin
Assistant Examiner — Keith Delahoussaye
(74) Attorney, Agent, or Firm — Andrew C. Cheng

(57) ABSTRACT

A heat-dissipation structure of a liquid crystal is disclosed. The heat dissipation structure comprises a light bar component having a circuit portion, the light bar component comprises a vertical plate and a horizontal plate, the vertical plate and the horizontal plate are formed by one-piece bending and are vertical to each other, and a plurality of LED light source modules are disposed on a surface of the vertical plate; and a back plate, the horizontal plate is disposed on the back plate. In the liquid crystal module and the heat dissipation structure, the bending light bar component is connected to the back plate. Compared with the traditional art, the liquid crystal module has narrower border, higher heat dissipation efficiency and longer life time.

3 Claims, 3 Drawing Sheets

(52) U.S. Cl.
CPC ............ *G02B 6/009* (2013.01); *G02B 6/0068* (2013.01); *G02F 2001/13332* (2013.01); *G02F 2001/133317* (2013.01)

(58) Field of Classification Search
USPC ........................................ 362/97.2, 234, 294
See application file for complete search history.

(56) References Cited

U.S. PATENT DOCUMENTS

| | | | | |
|---|---|---|---|---|
| 2013/0215601 | A1* | 8/2013 | Chen et al. | G02F 1/133608 362/97.2 |
| 2014/0301107 | A1* | 10/2014 | Mizutani | G02B 6/0091 362/612 |
| 2014/0340875 | A1* | 11/2014 | Hayashi | G02F 1/133308 362/97.1 |
| 2015/0277179 | A1* | 10/2015 | Nishi | G02B 6/0088 349/58 |

* cited by examiner

LIQUID CRYSTAL MODULE AND HEAT DISSIPATION STRUCTURE THEREFORE

BACKGROUND OF THE INVENTION

1. Field of the Invention

The present invention relates to a liquid crystal display field; in particular, to a liquid crystal module and a heat dissipation structure therefore.

2. Background of the Invention

With the development of the display technology, the display device has evolved from the cold cathode fluorescent lamps to the flat display now. The LCD device is the most popular display device nowadays. Because the LCD device does not emit by itself, some LED is employed to form a LED light bar component as a backlight source used in the LCD device. However, because of a large number of the LEDs, the heat dissipation of the LED light bar component is large. It is very important to solve the problem.

As shown in FIG. 1, a liquid crystal module in the market, and the liquid crystal module comprises a front frame 1, a plastic frame 2, a liquid crystal glass 3, an optical member 4, a LED light bar component 5 and a back plate 6, where the optical member 4 comprises a light guide and an optical film. The LED bar component 5 in the solution is fixed in the bending back plate. Because the efficiency of the LED heat which is mainly removed by contacting the light bar component 5 with the back plate 6 is lower, it cannot prolong the life time of the liquid crystal module; at the same time, because the back plate bends by itself to form a barrier wall for the liquid crystal module, the LED light bar component 5 is fixed on the barrier wall to thicken the liquid crystal module.

SUMMARY OF THE INVENTION

The technical problem of the present invention is to provide a liquid crystal module with high heat dissipation efficiency and a narrow border and its heat dissipation structure.

In order to achieve the above mentioned goal, the present invention employs the following solution:

A heat dissipation structure of a liquid crystal module, comprising: a light bar component having a circuit portion, the light bar component comprises a vertical plate and a horizontal plate, the vertical plate and the horizontal plate are formed by one-piece bending and are vertical to each other, and a plurality of LED light source modules are disposed on a surface of the vertical plate; and a back plate, the horizontal plate is disposed on the back plate.

Where, the cooling plate is made of metal.

Where, a heat-conductive insulation layer is between the cooling plate and the horizontal plate.

Where, the heat-conductive insulation layer is a heat-conductive insulation adhesive, the heat-conductive insulation layer bonds on a lower surface of the cooling plate.

Otherwise, a groove is disposed on the horizontal plate, a convex lug boss is disposed on the cooling plate, the lug boss is located in the groove, and a first hole and a second hole are respectively disposed in the lug boss and the groove, and a fixture joints to a thread of the back plate through the first hole and the second hole sequentially.

The present invention discloses a liquid crystal module, comprising a front frame, a plastic frame, a liquid crystal glass, an optical member, a light bar component and a back plate, wherein the light bar component comprises a circuit portion, a vertical plate and a horizontal plate vertical to the vertical plate, and the vertical plate and horizontal plate are formed by one-piece bending; a plurality of LED light source modules are disposed on a surface of the vertical plate, and the horizontal plate is disposed on the back plate; the plastic frame has an inserting port, and the vertical plate is embedded into the inserting port.

Where, a cooling plate disposed on a surface of the horizontal plate.

Where, a heat-conductive insulation layer is between the cooling plate and the horizontal plate.

Where, a groove is disposed on the horizontal plate, a convex lug boss is disposed on the cooling plate, the lug boss is located in the groove, and a first hole and a second hole are respectively disposed in the lug boss and the groove, and a fixture joints to a screw thread of the back plate through the first hole and the second hole sequentially.

The present invention discloses the liquid crystal module and its heat dissipation structure, where light bar component is bended for connecting to the back plate. Comparing with the conventional technology, the liquid crystal module has a narrower border and the higher heat dissipation efficiency which is good for the life time of the liquid crystal module.

DETAILED DESCRIPTION OF THE PREFERRED EMBODIMENTS

Figure 1:
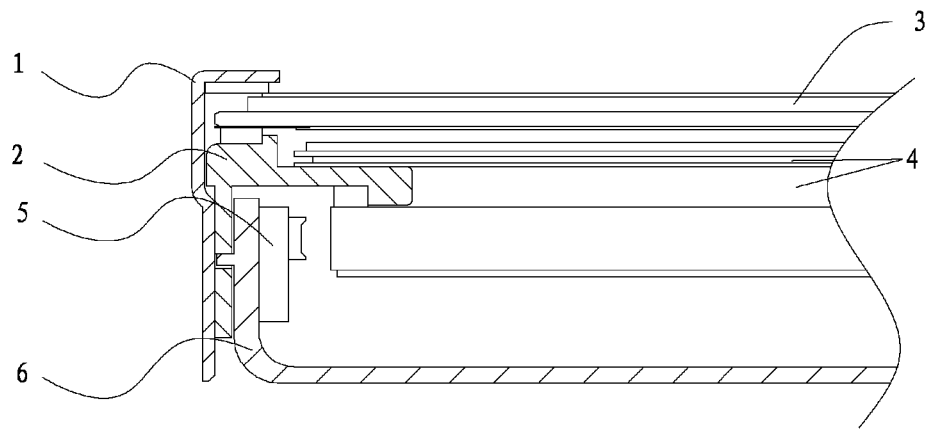
FIG. 1 is a structural diagram of the traditional liquid crystal module.

In order to elaborate the technical characteristics and the structure of the present invention well, the following examples combining with the accompanying drawings in detail. FIG. 1 is the structural diagram of the LCD device according to the embodiment of the present invention.

1st Embodiment

Figure 2:
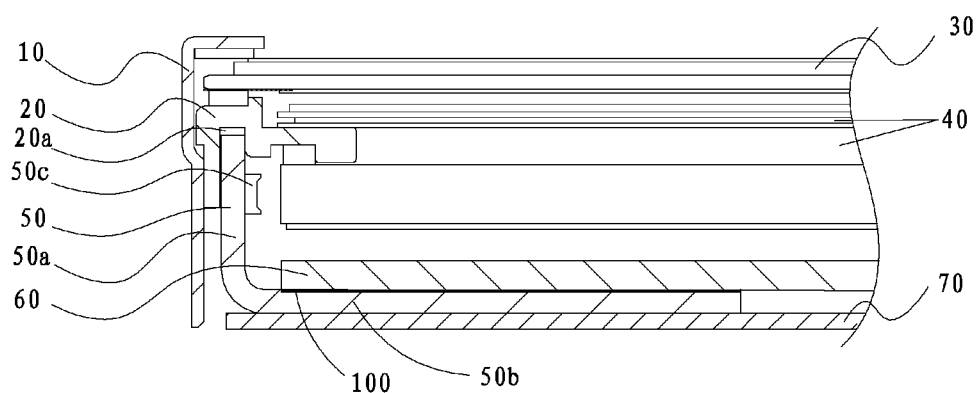
FIG. 2 is a structural diagram of the liquid crystal module according to the first embodiment of the present invention.

Please refer to FIG. 2. In the liquid crystal module of the first embodiment of the present invention, the liquid crystal module comprises a front plate 10, a plastic frame 20, a liquid crystal glass 30, an optical member 40, a light bar component 50 and a back plate 70, where a heat dissipation structure comprises a light bar component 50 and a back plate 70. The light bar component 50 has a circuit portion, a vertical plate 50a and a horizontal plate 50b which are formed by one-piece bending of the light bar component 50 and are vertical to each other. Pluralities of LED light source modules 50c are disposed on the surface of the vertical plate 50a. The horizontal plate 50b is disposed on the back plate 70, where the plastic frame has an inserting port 20a. The end of the vertical plate 50a is embedded into the inserting port 20a. The front frame 10 and the plastic frame 20 are used to fix the optical member 40, the liquid crystal glass 30 and so on.

The horizontal plate 50a of the light bar component 50 is disposed on the back plate 70. The lower surface of horizontal plate 50b is bonded closely to the metal back plate 70 and the horizontal plate takes away of part of the heat from the LED light source module 50c and the circuit portion. The present invention ensures the dissipation efficiency of the light bar component 50 and prolongs the life time of the liquid crystal module.

Figure 3:
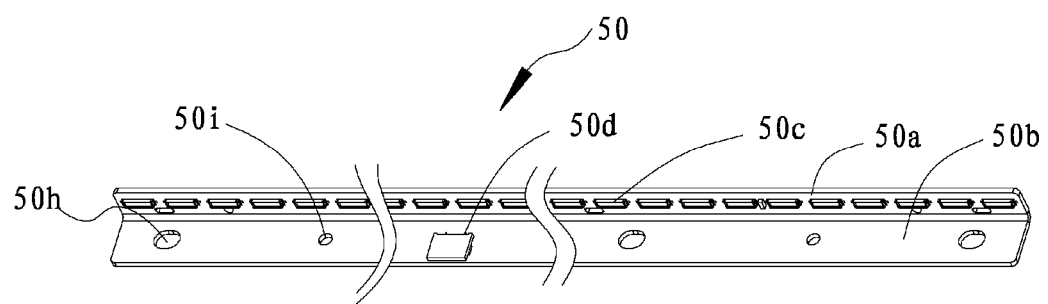
FIG. 3 is a structural diagram of the light bar component according to the first embodiment of the present invention.
Figure 4:
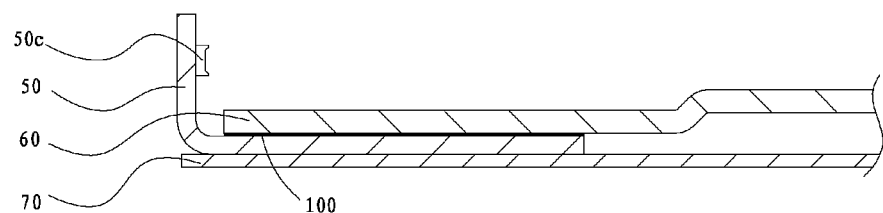
FIG. 4 is a structural diagram of the heat dissipation structure of the light bar component according to the first embodiment of the present invention.

Combining with FIG. 3, which is the structural diagram of the light bar component of the first embodiment of the present invention. The vertical plate 50a of the light bar component 50 after bending can be a barrier wall of the back plate. The LED light source module 50c is arranged uniformly in the light bar component 50 along the longitudinal direction; at the same time, the circuit portion (not shown in figures) of the LED light source module 50c and the IC (Integrated Circuit) chip 50d is made in one-piece on the light bar component 50. Comparing with the traditional structure, the barrier wall is omitted and the thickness of the LED light source module 50c is reduced, so as to narrow the side frame of the liquid crystal module.

Where, the heat dissipation structure further comprises a cooling plate 60. The cooling plate 60 is disposed on the top surface of the horizontal plate 50 and bonded closely to the light bar component 50 so that part of the heat is taken away from the top surface of the horizontal plate 50b of the light bar component 50. The most heat generated from the LED operation is taken away from the top and lower surfaces of the horizontal plate 50b of the light bar component 50 through the cooling plate 60 and the back plate 70.

Here, the cooling plate is made of metal material. The first embodiment employs the sheet metal of aluminum material having heat dissipation performance.

Because the cooling plate adopts the metal material, the contact area between the light bar component 50 and the cooling plate 60 is easy to be scratched such that the insulation layer on the surface of the light bar component 50 is broken then to cause a short circuit. In order to prevent this situation, the present embodiment disposes a heat-conductive insulation layer 100 between the cooling plate 60 and the horizontal plate 50b. The cooling plate 60 and the light bar component 50 does not contact directly to protect the light bar component 50.

Where, the heat-conductive insulation layer 100 is a thermal-conductive insulation adhesive, and the heat-conductive insulation layer 100 is bonded on the lower surface of the cooling plate 60.

Figure 5:
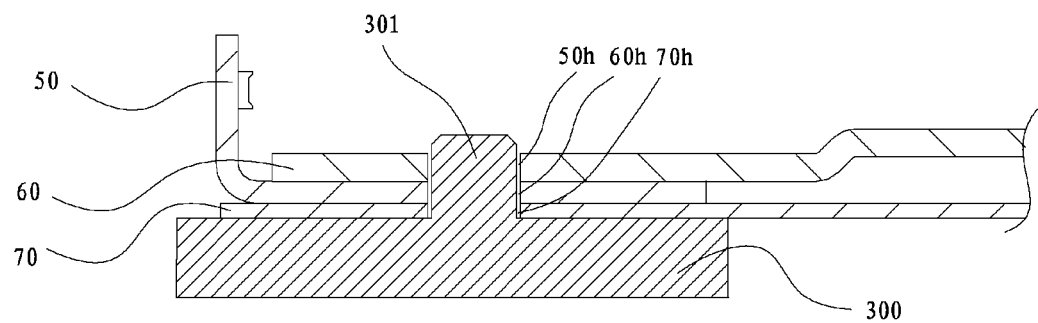
FIG. 5 is a structural diagram of the installing jig for the heat dissipation structure of the light bar component according to the first embodiment of the present invention.

Combining with FIG. 3 and FIG. 5, FIG. 5 is a jig for the easy installing heat dissipation structure of the liquid crystal module provided by the embodiment. The jig comprises a positioning base 300 and a row of positioning pillars 301. A plurality of fixing holes 50i and positioning holes 50h are located in the light bar component 50. The spacing of the positioning pillar 301 is arranged in opposite to the positioning holes 50h on the light bar component 50. The relative amount of perforations 60h, 70h are respectively disposed in the cooling plate 60 and the back plate 70. When assembling, the back plate 70, the cooling plate 60 and the light bar component 50 are positioned on the jig sequentially; then, the positioning pillar passes through the positioning hole 50h and the perforations 60h, 70h; hence, it can be sure immediately for the relative position of the light bar component 50, the cooling plate 60 and the back plate 70. Finally, a screw can be used in passing the fixing hole 50i, and the corresponding hole (not shown in figures.) on the cooling plate 60 and the back plate 70 sequentially to achieve accurate position of the light bar component 50, the cooling plate 60 and the back plate 70.

The accuracy of the assemble position of the light bar component 50 affects the optical grade of the incident side of the liquid crystal module extremely. In the embodiment, the LED light source modules 50c are set on the light bar component 50. The horizontal plate 50b of the light bar component 50 is disposed on the cooling plate 60. When assembling, it is only needs to be made sure of the assembling accuracy of the light bar component 50 and the back plate 70. Otherwise, the heat-dissipation structure is set up by the installing jig so as to enhance the assemble efficiency and ensure the assembling accuracy.

2nd Embodiment

Figure 6:
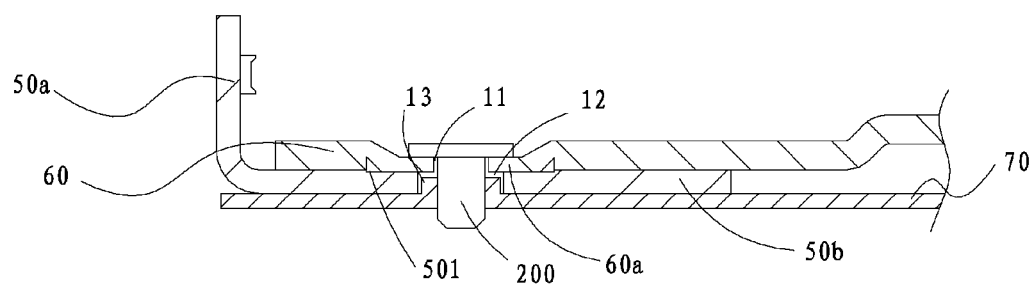
FIG. 6 is a structural diagram of the heat dissipation structure of the light bar component according to the second embodiment of the present invention.

Please refer to FIG. 6, which is a structural diagram of the heat dissipation structure of the light bar component. The difference of the first and second embodiments is that the second embodiment does not have heat-conductive insulation layer 100, and the circuit portion of the light bar component 50 is partially grounded or floating. A groove 501 is disposed on the horizontal plate 50b, and the copper is bare in the groove. A convex lug boss 60a is disposed on the cooling plate 60. The lug boss 60a is located in the groove, and the first hole 11 and the second hole 12 are respectively disposed on the lug boss 60a and the groove 501. A fixture 200 passes through the first hole 11 and the second hole 12 to joint into the thread of the back plate 70. Specifically, a projecting screw hole 13 is disposed in the back plate 70 and the screw hole 13 projects and embeds into the groove 501 of the horizontal plate 50b.

The structure makes the contact portion of the cooling plate 60 and the light bar component 50 is not on the surface of the light bar component 50. It protects the insulation layer of the surface of the light bar component 50 very well.

The above are only specific embodiments of the present invention, it should be noted that those of ordinary skill in the art, in the present invention without departing from the principles of the premise, further improvements and modifications may be made, these improvements and modifications should also be regarded as the protection scope of the present invention.

What is claimed is:

1. A heat dissipation structure of a liquid crystal module, comprising:
   a light bar component having a circuit portion, the light bar component comprises a vertical plate and a horizontal plate, the vertical plate and the horizontal plate are formed by one-piece bending and are perpendicular to each other, and a plurality of LED light source modules are disposed on a surface of the vertical plate; and
   a back plate, the horizontal plate is disposed on the back plate,
   wherein, a cooling plate is disposed on a surface of the horizontal plate while the back plate, the horizontal plate and the cooling plate are disposed in sequence, and a convex lug boss is disposed on the cooling plate;
   wherein, a projecting screw hole is disposed in the back plate and the screw hole projects and embeds into a groove disposed on the horizontal plate, a first hole is disposed in the convex lug boss located within radius of the groove, a second hole is disposed in the groove, and a fixture joints the first hole, the second hole and the screw hole sequentially.

2. The heat dissipation structure as claimed in claim 1, wherein the cooling plate is made of metal.

3. A liquid crystal module, comprising a front frame, a plastic frame, a liquid crystal glass, an optical member, a light bar component and a back plate, wherein the light bar component comprises a circuit portion and a vertical plate and a horizontal plate perpendicular to the vertical plate and the vertical plate and horizontal plate are formed by one-piece bending;

a plurality of LED light source modules are disposed on a surface of the vertical plate, and the horizontal plate is disposed on the back plate;

the plastic frame has an inserting port, and the vertical plate is embedded into the inserting port, wherein, a cooling plate is disposed on a surface of the horizontal plate while the back plate, the horizontal plate and the cooling plate are disposed in sequence, and a convex lug boss is disposed on the cooling plate;

wherein, a projecting screw hole is disposed in the back plate and the screw hole projects and embeds into a groove disposed on the horizontal plate, a first hole is disposed in the convex lug boss located within radius of the groove, a second hole is disposed in the groove, and a fixture joints the first hole, the second hole and the screw hole sequentially.

* * * * *